United States Patent [19]
Foster et al.

[11] Patent Number: 5,446,496
[45] Date of Patent: Aug. 29, 1995

[54] FRAME RATE CONVERSION WITH ASYNCHRONOUS PIXEL CLOCKS

[75] Inventors: Bradly J. Foster, Ft. Collins; David J. Hodge, Loveland; Steven J. Kommrusch, Ft. Collins, all of Colo.

[73] Assignee: Hewlett-Packard Company, Palo Alto, Calif.

[21] Appl. No.: 221,433

[22] Filed: Mar. 31, 1994

[51] Int. Cl.⁶ .................... H04N 7/01; H04N 9/64
[52] U.S. Cl. ..................... 348/441; 348/715; 348/718; 345/200
[58] Field of Search ........... 348/441, 459, 715, 718; H04N 7/01, 9/64; 345/185, 200; 395/192

[56] References Cited

U.S. PATENT DOCUMENTS

| | | | |
|---|---|---|---|
| 4,742,350 | 5/1988 | Ko et al. | 345/200 |
| 5,268,682 | 12/1993 | Yang et al. | 345/200 |
| 5,321,425 | 6/1994 | Chia et al. | 345/200 |

Primary Examiner—Victor R. Kostak

[57] ABSTRACT

A frame rate conversion system synchronizes data transfers to and from a VRAM frame buffer which are concurrent, continuous, and asynchronous. The system comprises a frame buffer having a split memory for communicating data to a split output shift register. A frame buffer control supervises writing operations to the split memory at a first frame rate. A display control supervises reading operations from the shift register at a second frame rate which is slower than the first frame rate. The frame buffer control and the display control communicate control signals through double synchronizers. The display control has a counter for counting frames of data which have been read from the VRAM frame buffer. The display control prevents the writing of a frame into the split memory after a particular number of frames has been counted so as to prevent the frame buffer control from writing over and destroying existing data which has not yet been read from the split memory by the display control. Moreover, the display control synchronizes the writing and reading operations by the frame buffer control and the display control, respectively, each time that a frame has been skipped. Furthermore, the frame buffer control causes the VRAM frame buffer to transfer data from the split memory to the shift register when the horizontal blank is deasserted within the incoming analog video signal.

8 Claims, 8 Drawing Sheets

FRAME RATE CONVERSION WITH ASYNCHRONOUS PIXEL CLOCKS

FIELD OF THE INVENTION

The present invention generally relates to processing of analog video signals, and more particularly, to a system and method for optimally synchronizing concurrent continuous pixel data transfers to and from a video frame buffer which are clocked asynchronously.

BACKGROUND OF THE INVENTION

A typical analog video signal 23 for driving an analog video display is illustrated in FIG. 1. As shown in FIG. 1, the analog video signal 23 is a composite signal having lines of analog data 24 combined with other sweep and synchronization (sync) signals. The composite analog video signal 23 of FIG. 1 generally comprises the following: a horizontal period 11 (a horizontal line), horizontal active time 12, horizontal blank (Hblank) time 13, horizontal front porch 14, horizontal sync (Hsync) period 15, horizontal back porch 16, vertical period 17 (a frame), vertical blank (Vblank) time 18, vertical front porch 19, vertical sync (Vsync) period 20, vertical back porch 21. During the front and back porches, the analog video signal 23 exhibits a blank amplitude level, and during sync periods, the analog video signal 23 exhibits a sync amplitude level.

Typically, the horizontal front porch 14 permits the electron beam associated with a raster display (not shown) to turn off before the beam sweeps from the end of a horizontal scan line to the beginning of the next horizontal scan line. The horizontal sync period causes the electron beam to move to the beginning of the next horizontal scan line and/or to reset counters and other support circuitry. The horizontal back porch 16 permits initialization of the electron beam and other support circuitry prior to acting upon a new scan line. Furthermore, the vertical front porch 19 permits the electron beam associated with the raster display to turn off before the beam sweeps from the end of a frame to the beginning of the next frame. The vertical sync period permits the electron beam to change frames. The vertical back porch 21 permits initialization of the electron beam and other support circuitry prior to acting upon a new frame.

If the analog video display is multicolor, then there would generally be one of the analog video signals 23 allocated to each color, such as for red, green, and blue. However, oftentimes only one of the analog video signals 23, for instance, the one allocated to green, has the sync levels 15, 20.

Recently, there has been a trend in the industry toward developing video displays which are driven by digital video signals as opposed to analog video signals. An example of such a digital video display is the model LQ12D011 TFT LCD flat panel display manufactured and made commercially available by the Sharp Corporation, Japan. Thus, it has recently been desirable to convert the analog video signal 23 of FIG. 1 into a digital video signal for driving a digitally-controlled display. In the process of converting the analog video signal 23 into a digital video signal, the analog data 24 is converted to a series of digital codes, depending upon its amplitude at a given point in time. For Sharp's digital display device, the analog data 24, which typically represents 256 different intensity levels for a particular color, must be converted to only 8 intensity levels (for instance, levels 0 through 7) per color. The lowest possible color intensity level is commonly referred to as the "black" level, whereas the highest possible color intensity level is commonly referred to as the "white" level.

FIG. 2 illustrates a conventional analog-to-digital interface system 21 for converting the analog video signal 23 (FIG. 1) on connection 26 to a digital video signal on connection 43 for driving a digitally-controlled display 25, for example, Sharp's model LQ12D011 TFT LCD flat panel display. The analog video signal 23 is input to the system 21 on connection 26 via a transmission line, commonly a coaxial cable or other like analog communications interface. A dot clock generator 28 produces a dot clock signal 29 based upon the analog video signal 23 on connection 26, sometimes by monitoring the spacing of Hsync periods 15 within the analog video signal 23. An analog-to-digital converter (ADC) 32 converts the analog video signal 23 to a digital video signal at ADC output connection 33 under the control of the dot clock signal on the connection 29a. The digital video signals are stored in a memory 34, such as a FIFO buffer, line buffer, or frame buffer (for instance, a video random access memory (VRAM)). Under the control of the control logic 36, the pixel data is transferred from the memory 34 to buffers/drivers 42 and ultimately to the digitally-controlled display 25.

Sometimes, the display 25 is designed to have the same timing parameters as the analog video signal 23. These timing parameters generally include the frame refresh rate, or rate at which a frame of pixel data is displayed or transferred, front porches 14, 19, back porches 16, 21, and sync periods 15, 20, as indicated in FIG. 1. In these circumstances, there are no timing problems because pixel data is transferred to and from the memory 34 under the control of the control logic 36 at generally the same rate at which the system 21 receives the analog data 24 within the analog video signal 23 on input connection 26. In other words, the blank and sync levels (FIG. 1) are aligned in time with the corresponding periods on connection 43 of FIG. 2. The aforementioned approach is that which most display manufacturers have taken. However, this approach is undesirably inflexible in that it requires the incoming analog video signal and the display 25 to have substantially the same timing parameters as described.

Another approach is to implement a separate display oscillator within the control logic 36 for generating the sync signals for the display 25. In this approach, the display clock signal is inherently asynchronous with the dot clock signal produced by the dot clock generator 28. This approach provides for greater flexibility than other prior art embodiments. If the timing parameters of the analog signal 23 change and/or the requirements of the display 25 change, ideally only an oscillator need be changed to accommodate the new system requirements. However, although this approach exhibits great promise in terms of flexibility, it is problematic in getting the two clock domains to efficiently and reliably interact at high frequencies. Specifically, there are problems associated with continuously and concurrently transferring data to and from the memory 34 at very different high frequencies. Most attempts to accomplish the foregoing have resulted in very apparent visual distortion on the screen of the display 25.

SUMMARY OF THE INVENTION

Therefore, it is an object of the present invention to overcome the deficiencies and inadequacies of the prior art as noted above and as generally known in the industry.

Another object of the present invention is to provide a system and method for synchronizing data transfers to and from a video frame buffer which are asynchronous, concurrent, and each continuous.

Another object of the present invention is to provide a system for synchronizing concurrent, continuous, asynchronous pixel data transfers to and from a video frame buffer which is simple in design, inexpensive to manufacture, and reliable in operation.

Briefly described, the present invention is a frame rate conversion system for synchronizing data transfers to and from a video frame buffer which are asynchronous, concurrent, and continuous. The frame rate conversion system comprises a frame buffer, preferably a VRAM, for storing a frame of pixel data, the frame buffer having a split memory for communicating the pixel data to a split output shift register. A frame buffer control mechanism controls writing operations of incoming pixel data to the split memory at a first frame rate. A display control mechanism controls reading operations of the pixel data from the output shift register at a second frame rate which is slower than the first frame rate. The display control mechanism has a counter for counting frames of data which are read from the split output shift register. The display control mechanism aligns in time initiation of the writing and reading operations after a particular number of the frames to the display has been counted. Significantly, the display control mechanism prevents the writing operation during a frame just after the particular number of the frames has been counted, i.e., just after the synchronization event, so as to prevent the frame buffer control mechanism from writing over and destroying existing pixel data which has not yet been read from the split memory.

In the preferred embodiment, the display control mechanism comprises the following. A display oscillator generates a display clock signal. A horizontal synchronization state machine receives the display clock signal and generates display horizontal synchronization signals for driving a display. A vertical synchronization state machine receives the display clock signal and incoming vertical synchronization signals and generates a display vertical synchronization signal for driving the display. Finally, a counter is connected to the vertical synchronization state machine and is configured to count frames of the pixel data read from the frame buffer so that the vertical synchronization state machine can determine the particular number of the frames read from the frame buffer.

The present invention further provides for and can be viewed as several novel methods. One method synchronizes concurrent synchronous data transfers to and from a video frame buffer. This method comprises the following steps: performing writing operations of the pixel data to the split memory at a first frame rate; performing reading operations of the pixel data from the split output shift register at a second frame rate which is slower than the first frame rate; counting frames of the pixel data which are read from the split output shift register; after a particular number of frames has been counted, synchronizing the writing and reading operations; and after the foregoing synchronization event, preventing the writing of a frame into the split memory so as to prevent writing over and loss of existing pixel data which has not yet been read from the split memory.

Another method is provided for initiating internal data transfers within a VRAM utilized as a video frame buffer. The method optimally transfers data from a split memory of the video frame buffer to a split output shift register so that asynchronous continuous data transfers to and from the video frame buffer can be performed. This method comprises the following steps: monitoring a blank period of an incoming video signal; during transfer of an output data line from one region of the split output shift register, initiating transfer of an internal data line from another split memory to the other split output shift register when the blank period is asserted, provided that a prior internal data line has not already been transferred during the transfer of the current output data line.

In addition to accomplishing the objects set forth previously, the present invention has other advantages, a few of which are listed hereafter.

An advantage of the present invention is that it avoids tearing of an image.

Another advantage is that it permits data transfers to and from a video frame buffer without interruption of either writing or reading operations.

Another advantage of the present invention is that it is flexible in design in that only the oscillator need be changed to accommodate new timing parameters between an incoming analog signal and a digitally-controlled display.

Other objects, features, and advantages of the present invention will become apparent to one of skill in the art upon examination of the following drawings and detailed description. It is intended that any such additional objects, features, and advantages be incorporated herein.

BRIEF DESCRIPTION OF THE DRAWINGS

The present invention can be better understood with reference to the following drawings. The drawings are not necessarily to scale, emphasis instead being placed upon clearly illustrating principles of the present invention.

DETAILED DESCRIPTION OF THE PREFERRED EMBODIMENT

Figure 3:
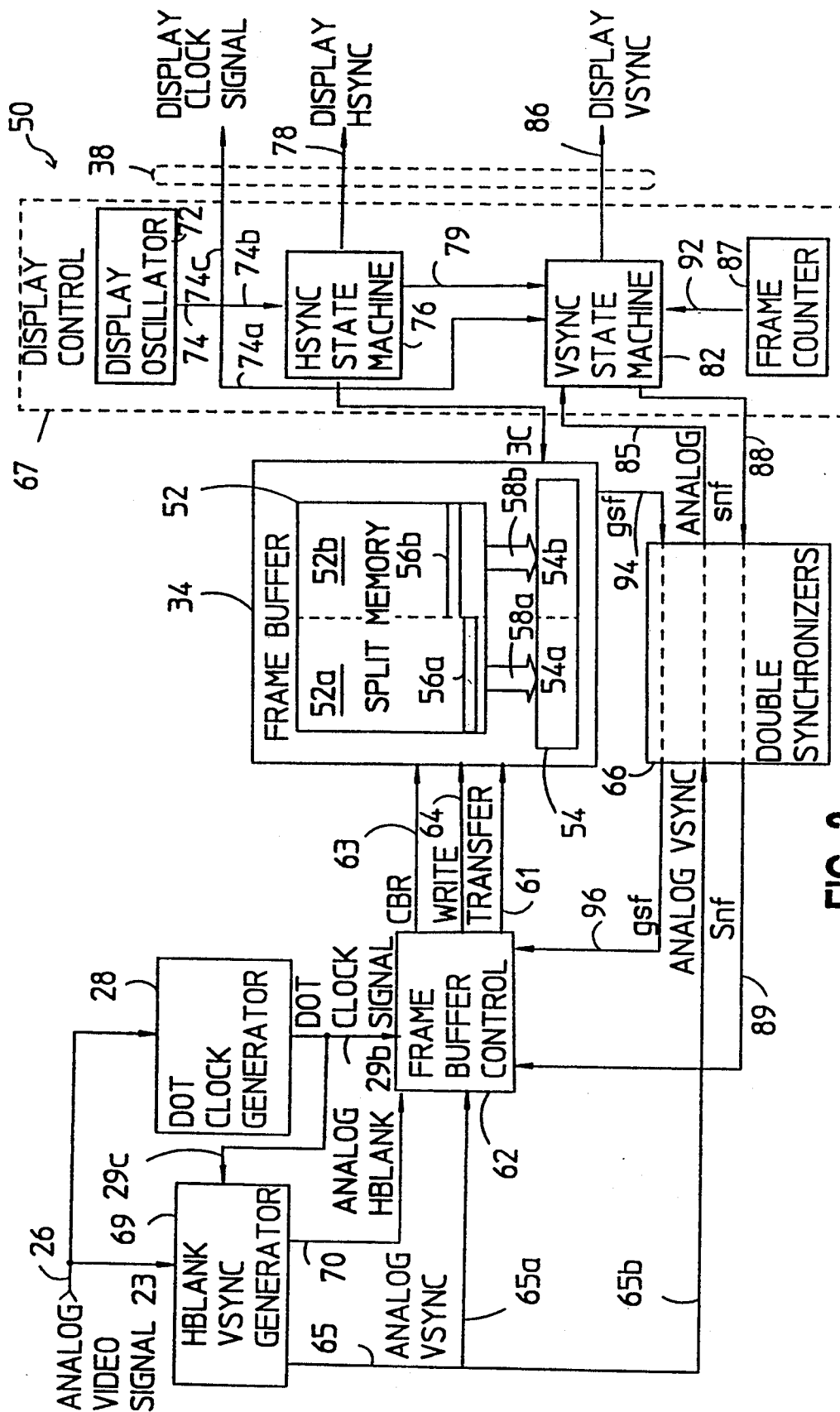
FIG. 3 is a schematic circuit diagram of a frame rate conversion system in accordance with the present invention for reading data from a frame buffer for the digitally-controlled display of FIG. 2 with a display clock signal which is asynchronous to a dot clock signal for writing data to the frame buffer.

With reference now to the drawings wherein like reference numerals designate corresponding parts throughout the several views, FIG. 3 illustrates a frame rate conversion system 50 in accordance with the present invention for synchronizing data transfers to and from a frame buffer 34, preferably a video random access memory (VRAM). The data transfers to and from the VRAM frame buffer 34 are concurrent and asynchronous with respect to each other. Furthermore, it should be emphasized that neither the data transfer into the VRAM frame buffer 34 nor out of the VRAM frame buffer 34 can be stopped and are, in other words, continuous.

In structure, as shown in FIG. 3, the frame rate conversion system 50 comprises the VRAM frame buffer 34 having a split memory 52 with adjacent first and second memory regions 52a, 52b. Moreover, a split output shift register 54 has adjacent first and second register regions 54a, 54b. The operation of the split memory 52 and the split shift register 54 is well known in the art. Briefly described, data lines can be written into either of the regions 52a, 52b or read from either register regions 54a, 54b. Moreover, data lines 56a, 56b can be independently transferred from the respective memory regions 52a, 52b to the respective register regions 54a, 54b, as indicated by reference arrows 58a, 58b. While data lines 56a, 56b are being written to one of the memory regions, 52a, 52b, data lines are concurrently being read from one of the register regions 54b, 54a. Because of the foregoing split configuration in the memory 52 and the split output shift register 54, data can be concurrently written to and read from the single VRAM frame buffer 34.

A Hblank and Vsync (Hblank/Vsync) generator 69 produces Hblank signals and Vsync signals respectively on connections 65, 70 from the incoming analog video signal 23 on connection 26. Many configurations for the Hblank/Vsync generator 69 can be employed and are well known in the art. Preferably, the Hblank/Vsync generator 69 generates the Hblank and the Vsync signals connections 70, 65 directly from the analog video signal on connection 26 by a comparison operation to a reference voltage. Further, the generator 69 then utilizes the dot clock signal on connection 29c from the dot clock generator 28 in order to generate the Hblank signal on connection 70, 65, which lie on either side of the sync signals.

A frame buffer control 62 controls whether incoming digital data is written to the split memory 52 within the VRAM frame buffer 34. Generally, the frame buffer control 62 controls the writing operations with a write control signal on write control connection 64. The frame buffer control 62 receives the dot clock signal 29b from the dot clock generator 28 and an analog Hblank and Vsync signals from the Hblank/Vsync generator 69 on respective connections 70, 65, so that incoming digital data can be clocked into the split memory 52. The frame buffer control 62 uses the incoming Vsync signal to derive the write control signal on connection 64.

Double synchronizers 66 are employed in the system 50 for communicating control signals from one clock domain to another domain. More specifically, the frame buffer control 62 resides in one clock domain and is clocked by the dot clock signal on connection 29b, whereas a display control 67 resides in another clock domain and is clocked by an independent display oscillator 72. The incoming Vsync signal on connection 65b from the generator 69 is passed through the double synchronizer 66 to the display control 67 along with some other control signals which will be noted later in this document.

The display control 67 controls the shifting (reading) of data from the split output shift register 54 via a serial clock (read control signal) on connection 68. The display control 67 comprises a display oscillator 72 for generating a display clock signal on connection 74. An Hsync state machine 76 receives the display clock signal on connection 74b and generates the read control signal on connection 68 and a display Hsync signal on connection 78 (reference numeral 78 is a part of connection 38 in FIG. 2). A Vsync state machine 82 receives the display clock signal on connection 74a from the display oscillator 72, a vertical decision flag on connection 79 from the Hsync state machine 76 indicating when a Vsync state machine transition can occur, and the incoming Vsync signal on connection 85 from the double synchronizers 66 (ultimately from the generator 69). The vertical decision flag on connection 79 insures that the display Vsync transition is concurrent with the display Hsync transition. The Vsync state machine 82 generates a display Vsync signal on connection 86 (part of connection 38 in FIG. 2) for the display 25 (FIG. 2) and a skip-next-frame (snf) signal on connection 88, which is passed through the double synchronizer 66 and onto connection 89 to the frame buffer control 62. A frame counter 87 counts frames by counting lines of data transferred to the display 25 and provides a frame count signal to the Vsync state machine 82 via connection 92.

The VRAM frame buffer 34 outputs a qsf control signal on connection 94 which is ultimately sent to the frame buffer control 62 via the double synchronizers 66 and the connection 96. The qsf control signal is well known in the art and essentially indicates whether data is currently being transferred from the register region 54a or whether data is being transferred from the register region 54b.

In the preferred embodiment the analog video signal 23 is specified as indicated in Table A hereafter and the digital video signal for driving the display 25 (FIG. 2) is specified as set forth in Table B hereafter. However, it should be emphasized that the present invention is not limited to the particular parameters in these tables and is applicable to many others. These parameters are only disclosed for a clearer understanding of the present invention. Furthermore, in the preferred embodiment, the display 25 (FIG. 2) reads two pixels at a time, and accordingly, the term "tile" in Table B means two adjacent pixels.

TABLE A

| ANALOG VIDEO SIGNAL | |
| --- | --- |
| Resolution | 1024 × 768 |
| dot clock | 84.587 MHz |

TABLE A-continued
ANALOG VIDEO SIGNAL

| | |
|---|---|
| pixel time | 11.82 ns |
| hor. frequency | 62.936 kHz |
| hor. period | 15.888 μs (1344 pixels) |
| hor. front porch | 0.756 μs (64 pixels) |
| hor. sync width | 1.513 μs (128 pixels) |
| hor. back porch | 1.513 μs (128 pixels) |
| hor. blanking | 3.783 μs (320 pixels) |
| hor. active scan | 12.105 μs (1024 pixels) |
| vert. frequency | 74.924 Hz |
| vert. period | 13.346 ms (840 lines) |
| vert. front porch | 63.55 μs (4 lines) |
| vert. sync width | 63.55 μs (4 lines) |
| vert. back porch | 1.016 ms (64 lines) |
| vert. blanking | 1.144 ms (72 lines) |
| vert. active scan | 12.202 ms (768 lines) |

TABLE B
DIGITAL VIDEO SIGNAL

| | |
|---|---|
| Resolution | 1024 × 768 |
| display clock | 27.0125 MHz |
| tile time | 37.020 ns |
| hor. frequency | 51.947 kHz |
| hor. period | 19.250 μs (520 tiles) |
| hor. front porch | 0.148 μs (4 tiles) |
| hor. sync width | 0.148 μs (4 tiles) |
| hor. back porch | — |
| hor. blanking | 0.296 μs (8 tiles) |
| hor. active scan | 18.954 μs (512 tiles) |
| vert. frequency | 66.600 Hz |
| vert. period | 15.015 ms (780 lines) |
| vert. front porch | 154.00 μs (8 lines) |
| vert. sync width | 77.00 μs (4 lines) |
| vert. back porch | — |
| vert. blanking | 0.231 ms (12 lines) |
| vert. active scan | 14.784 ms (768 lines) |

Method for Performing Frame Rate Conversion While Avoiding Video Tearing

The dot clock signal on connection 29b from the dot clock generator 28 and the display clock signal on connection 74 from the display oscillator 72 operate asynchronously relative to each other. Hence, data is being written to the VRAM frame buffer 34 with the dot clock signal, while data is being read from the VRAM frame buffer 34 with the display clock signal. Somehow, the writing and reading operations relative to the VRAM frame buffer 34 need to be synchronized or else video tearing will occur. "Video tearing" occurs, for instance, when writing operations to the VRAM frame buffer 34 are faster than and catch up to reading operations from the VRAM frame buffer 34. In other words, there will exist a frame where writing operations catch up to reading operations, thus generating a screen defined by a combination of two data frames with a "tear" therein.

The frame in which a tear occurs can be predicted based upon the known requirements of the analog video signal and the display 25. In order to overcome the tearing problem, in a very broad sense, a certain number of data frames is eliminated from the data which is input to the split memory 52, and the display Vsync signal on connection 86 is synchronized with the incoming Vsync signal on connection 65 of FIG. 3 by adding additional display horizontal lines 11 (FIG. 1) during the display vertical front porch 19 (FIG. 1).

Figure 1:
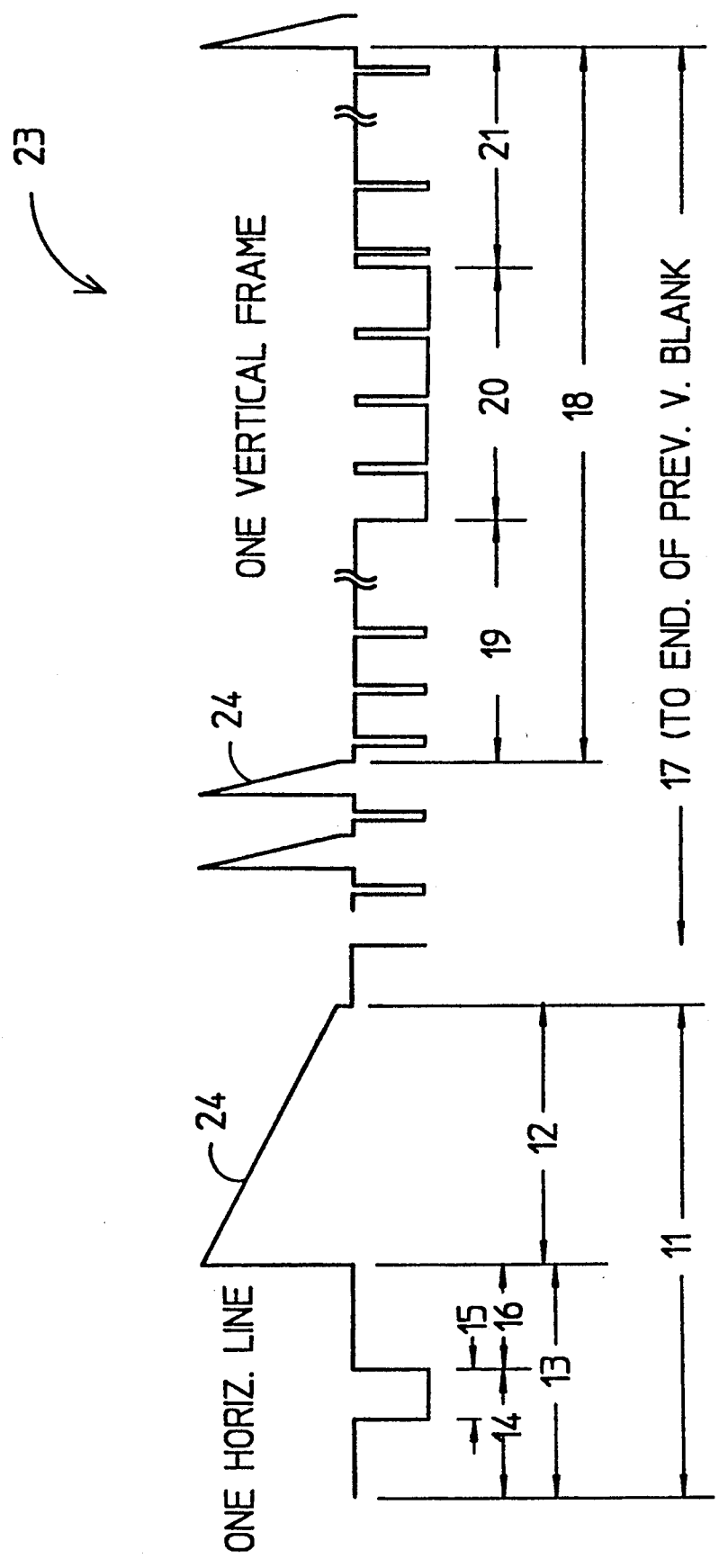
FIG. 1 is a graph illustrating a typical composite analog video signal having analog data as well as timing parameters.

Based upon the data information set forth in Tables A and B hereinbefore, it was determined that for every 9 frames sent in the analog video signal 23, the digital video signal would drive only 8 to the display 25 (FIG. 1). From Table A, it is apparent that the frame refresh rate is nominally 75 Hz. Accordingly, the frame refresh rate of the digital video signal is nominally 66.6 Hz (75 times 8/9). The display Vsync signal on connection 86 is synchronized with the incoming Vsync signal on connection B5 after every 8 frames in the digital video signal, or after every 120 milliseconds. Further, because the digital video signal to Sharp's model LQ12D011 display has a nominal vertical frequency of 67.3 Hz, extra display Hsync signals (an average of 64 for every 8 frames) are added during the front porch 19 (FIG. 1) of the incoming vertical blank (Vblank) period to slow the display frame refresh rate of nominally 67.3 Hz to the desired value of 66.6 Hz.

The display oscillator 72 generates a display clock signal of 54.025 MHz which is divided by 2 to produce the display tile clock of 27.0125 MHz in the preferred embodiment. As a result, the first 7 frames always have 8 extra display horizontal lines 11 (FIG. 1) and the 8th frame has nominally 8 as well. Given oscillator tolerances, the exact number of extra horizontal lines 11 on the 8th frame cannot be accurately predicted. However, it can be guaranteed that with manufacturing tolerances there will be a worst case difference of ±2 horizontal lines to display 25 in the 8th frame.

Because of the potential generation of undesirable DC bias internal to the display 25 (FIG. 2), the number of display horizontal lines 11 added to each frame should be such that the disparity between two contiguous frames is minimized and the number of added horizontal lines 11 should be a multiple of two. In other words, the difference in the number of horizontal lines 11 between any two frames should be as close to zero as possible to eliminate undesirable DC biasing problems. Accordingly, it is unacceptable to allow ⅞ of the frames to have no extra display horizontal lines 11 and the 8th frame to have all the extra display horizontal lines 11. Preferably, the total number of extra display horizontal lines 11 are divided equally among the frames and there is no more than ±2 horizontal lines between the 8th frame and the first 7 frames.

Figure 4:
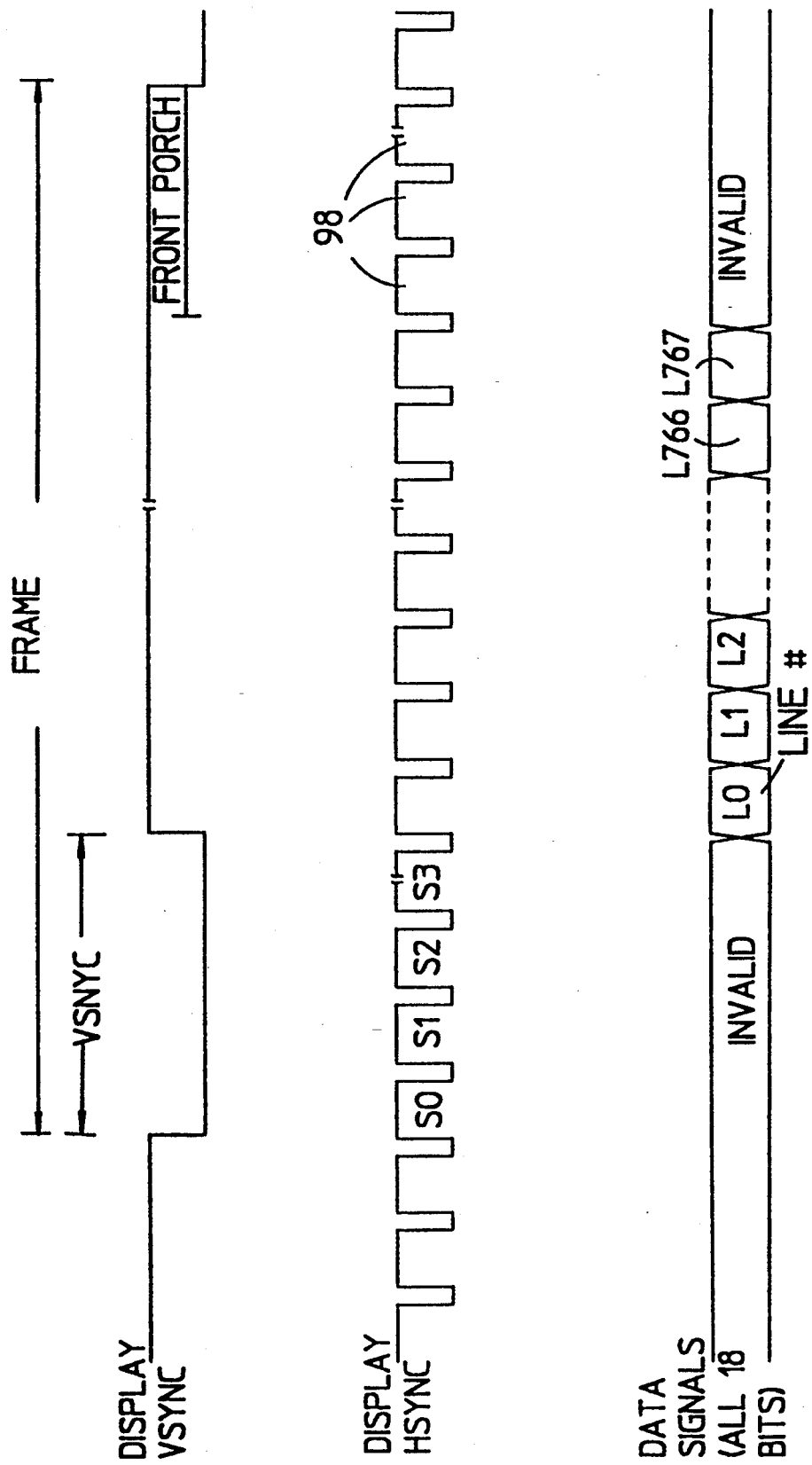
FIG. 4 is a graph illustrating display sync signals generated by the frame rate conversion system of FIG. 3 for the digitally-controlled display of FIG. 2 and further illustrating insertion of extra display Hsync periods for synchronizing the display Vsync signal with the analog Vsync signal.
Figure 5:
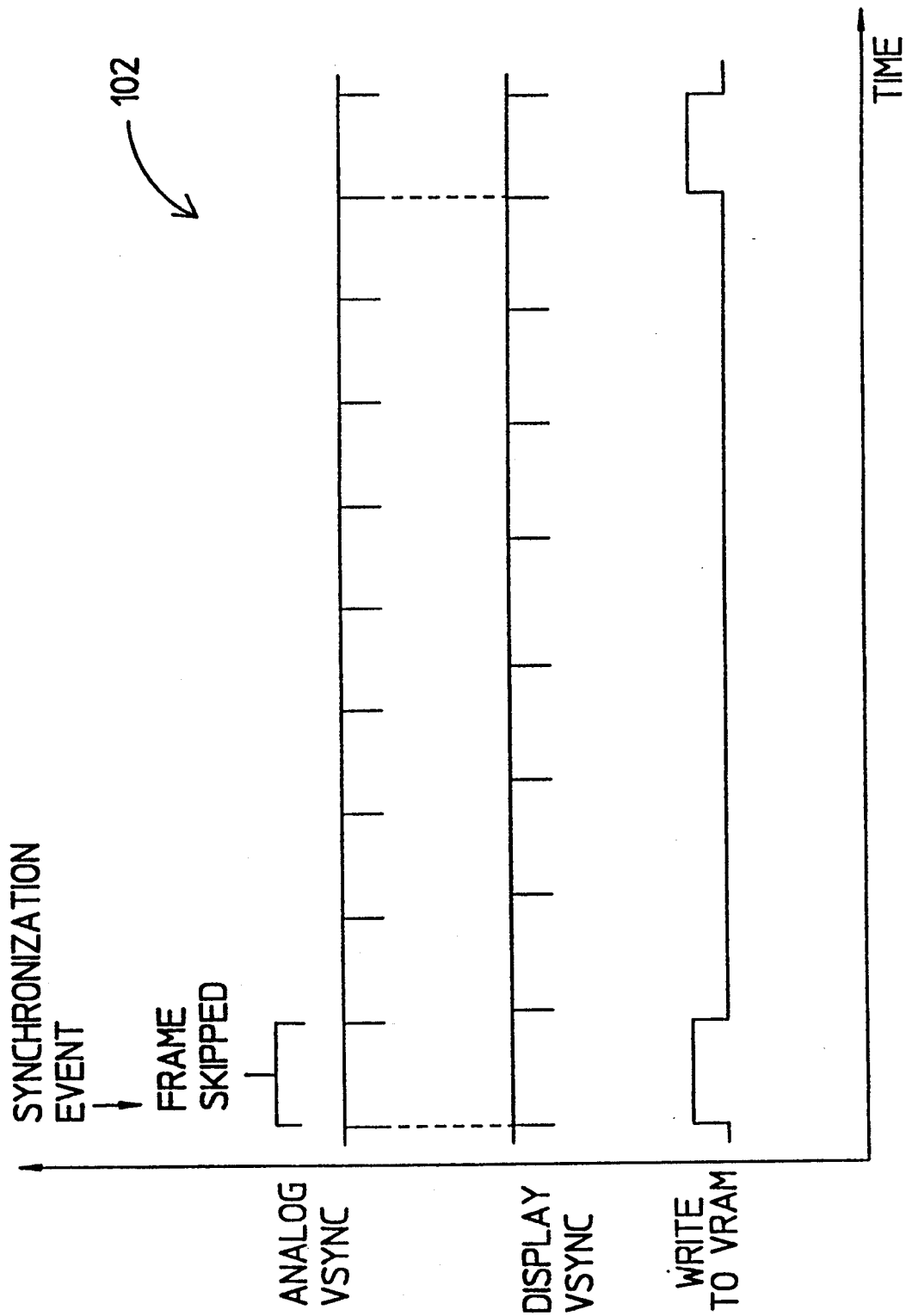
FIG. 5 is a graph illustrating synchronization of the display Vsync signal with the analog Vsync signal wherein 8 of 9 frames from the analog video signal are transferred to the display.

FIG. 4 is a graph illustrating addition of the extra display horizontal lines 98. As shown in FIG. 4, extra display horizontal lines 98 are generated by the Hsync state machine 76 during the vertical front porch 19 of the incoming analog video signal 23, because the Vsync state machine 82 holds off the assertion of Vsync during the vertical front porch 19, so that the overall period of the display Vsync signal on connection 86 is prolonged. Moreover, during the 8th frame, any of 6, 8, or 10 extra display horizontal lines 98 (FIG. 4) are generated so that the display Vsync signal on connection 86 can be synchronized with the incoming Vsync signal on connection 65, as is illustrated in FIG. 5. As is shown in FIG. 5, the first frame of data within the analog video signal 23 is skipped by deasserting the write control signal on the write control connection 64 from the frame buffer control 62 to the VRAM frame buffer 34. This causes the VRAM frame buffer 34 to refrain from writing new data from the incoming analog video signal 23 into the split memory 52. The first frame of the analog video signal 23 is skipped because the display Vsync signal on connection 86 has no back porch (see Table B) and gets a head start on the incoming analog video signal 23, as will be further described in detail hereafter.

The novel methodology associated with the frame rate conversion system 50 of FIG. 3 can be described as follows. After the system 50 is running in the steady state condition, the Vsync state machine 82 holds off the display Vsync signal on connection 86 until the incoming Vsync signal is received on connection 85. When this event occurs, the incoming analog video signal 23 will complete its 4 lines of Vsync period 20 and then proceed through 64 lines of vertical back porch 21. During this time interval, the 4 lines of display Vsync period 20 on connection 86 will finish and immediately require a new data frame as the display 25 (FIG. 2) has no back porch 21 (FIG. 1). Because the incoming analog video signal 23 does not have a chance to write the first pixel data into the VRAM frame buffer 34 when the display 25 requests it, because video tearing will otherwise result, and because writing operations will catch up to reading operations during the first frame, the first frame of incoming analog video signal is not written into the split memory 52 of the VRAM frame buffer 34. While the input frame to be discarded is at the input of the VRAM frame buffer 34, the output shift register 54 only outputs the data contained in the split memory 52. Because the incoming video frame rate is faster than the display frame rate, the incoming video frame rate will complete the discarded frame and start the next new frame before the output shift register 54 finishes its first frame. After the first frame is discarded from the incoming analog video signal 23, the next 8 incoming frames are written into the split memory 52 of the VRAM frame buffer 34 (1 discarded+8 written to VRAM frame buffer 34 to be displayed later=9 total frames). During the time that the incoming analog video signal 23 has transferred 8 frames, the output shift register 54 will have shifted out only 8 frames and the display control 67 will then wait until it receives the incoming Vsync signal prior to asserting the display Vsync signal on connection 86. At this point, the incoming and display Vsync signals are again aligned and the aforementioned cycle repeats.

Figure 6:
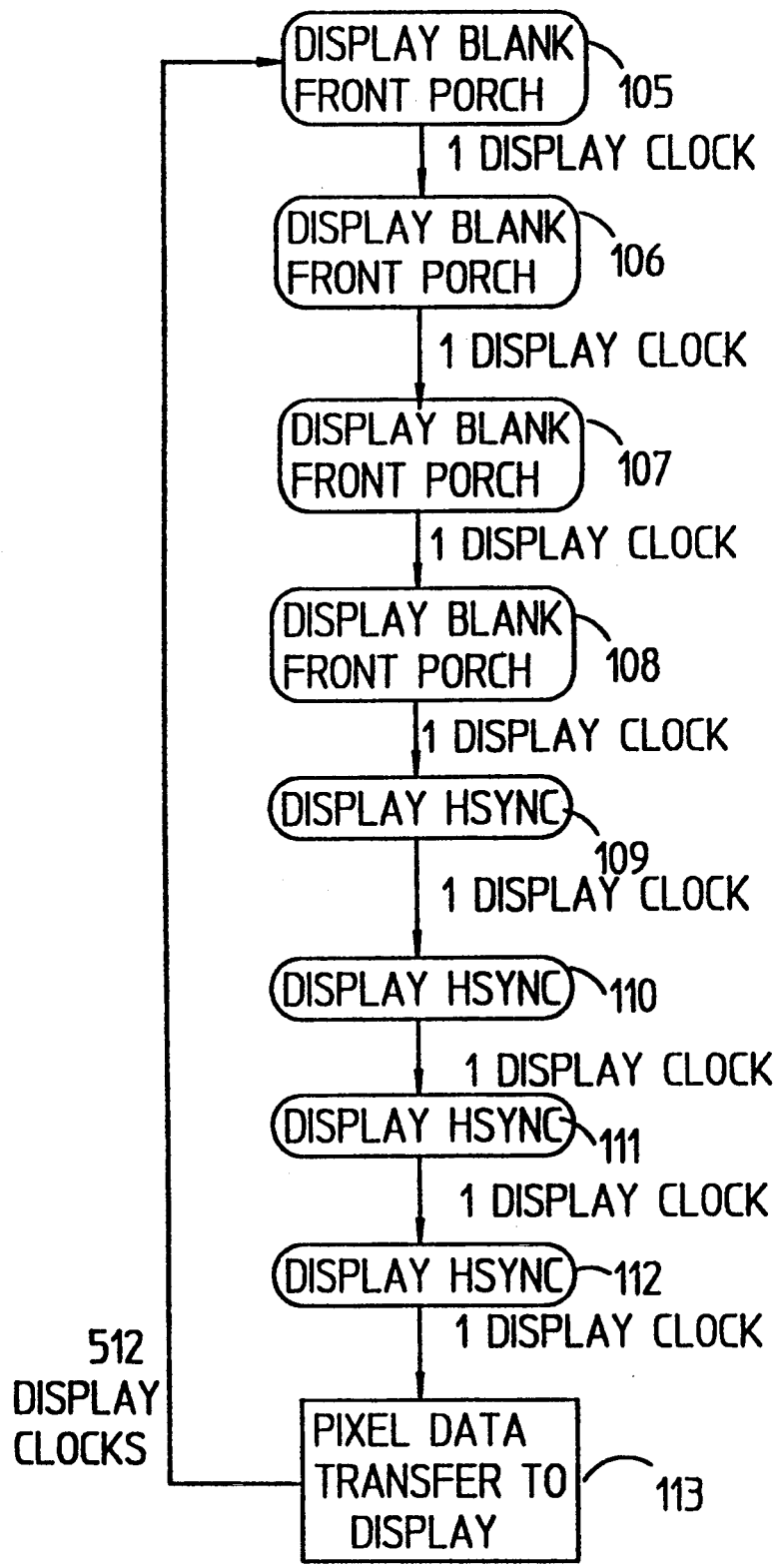
FIG. 6 is a state diagram illustrating the logic structure, functionality, and operation of a display Hsync state machine of FIG. 3.

A state diagram 104 illustrating the logic structure, functionality, and operation of the Hsync state machine 76 is shown in FIG. 6. The Hsync state machine 76 is preferably implemented in conventional programmable array logic (PAL). However, obviously, other implementations are possible, including hardware, software, or combinations thereof.

Figure 2:
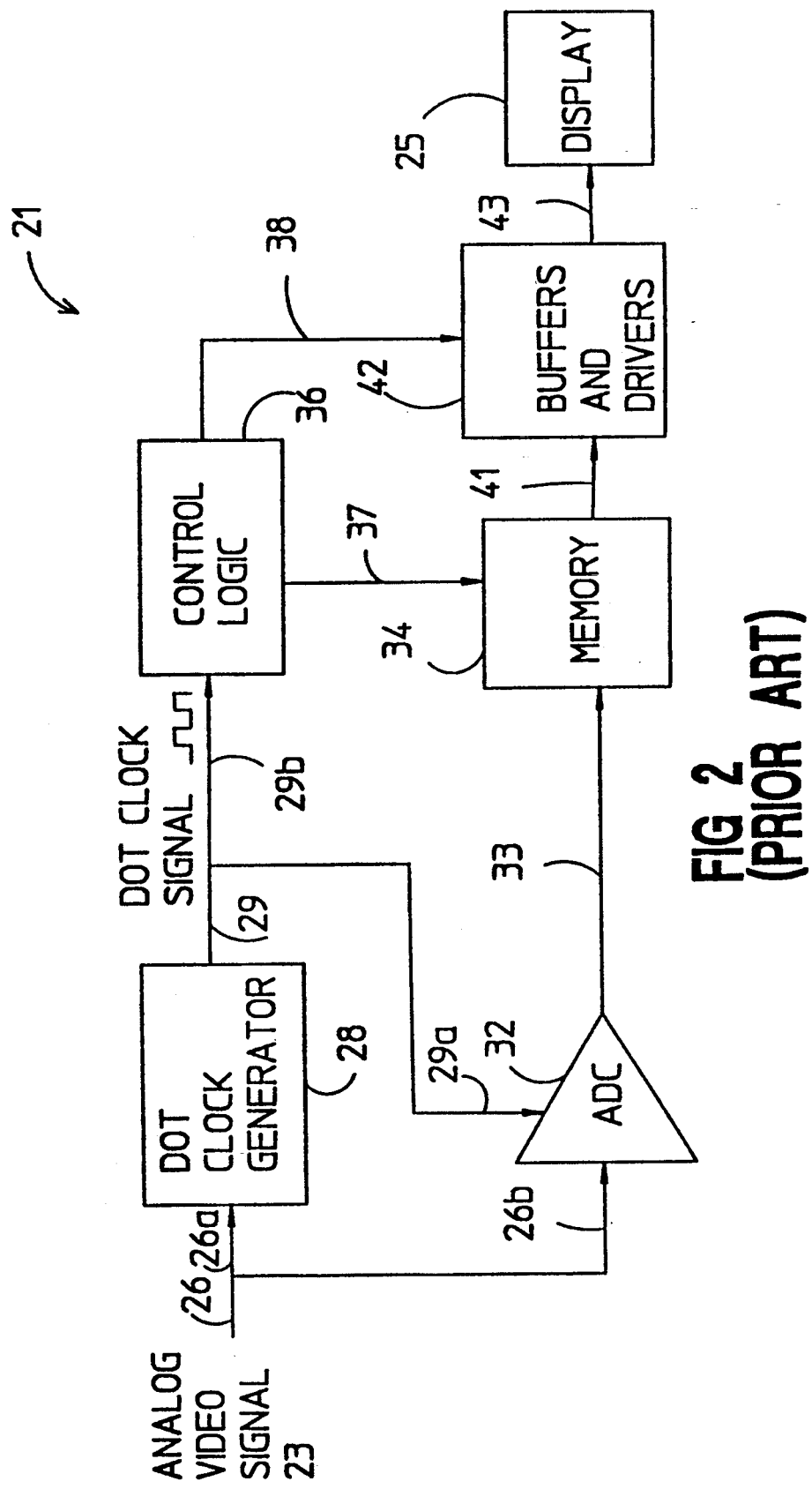
FIG. 2 is a schematic circuit diagram of a typical analog-to-digital interface system for driving a digitally-controlled display with the analog video signal of FIG. 1.

Referring to FIG. 6, the Hsync state machine 76 progresses through 4 states 105–108 after successive cycles of the display clock signal on connection 74b. During the states 105–108, the front porch of a blank period occurs in the digital video signal to be displayed on display 25 (FIG. 2). Next, the Hsync state machine 76 progresses through 4 more states 109–112 during 4 more successive cycles of the display clock signal on connection 74b. During each of the foregoing states, the Hsync state machine 76 outputs a display Hsync on connection 78. Finally, after another cycle of the display clock signal on connection 74b, the Hsync state machine 76 causes data to be read from the output shift register 54 in the VRAM frame buffer 34 via the read control connection 68. After 512 cycles in the display clock signal on connection 74b, the Hsync state machine 76 progresses back to state 105, as shown in FIG. 6, and repeats the aforementioned process.

Figure 7:
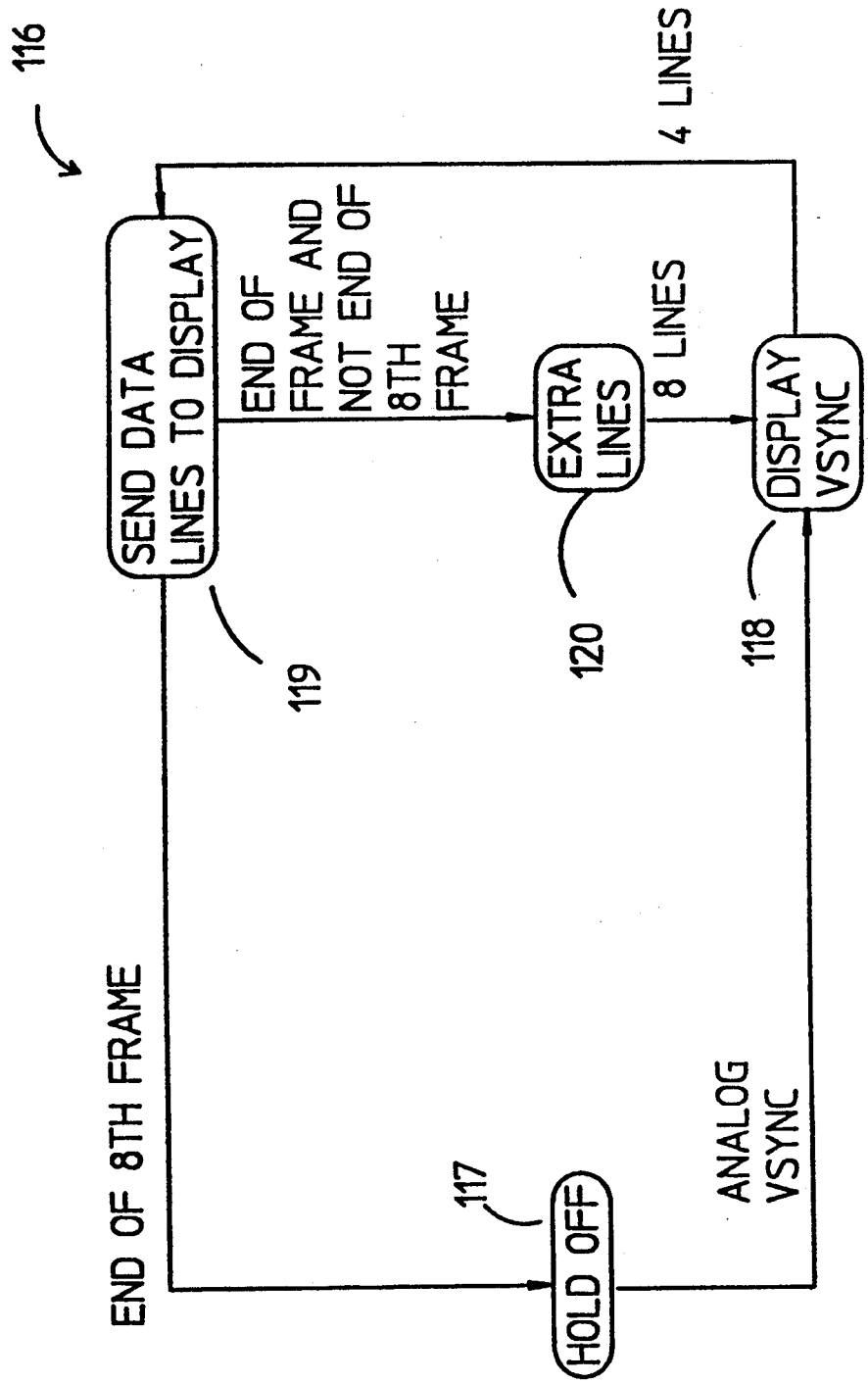
FIG. 7 is a state diagram illustrating the logic structure, functionality, and operation of a display Vsync state machine of FIG. 3.

A state diagram 116 of FIG. 7 illustrates the logic structure, functionality, and operation of the Vsync state machine 82. The Vsync state machine 82 is preferably implemented in conventional programable array logic (PAL). However, obviously, other implementations are possible, including hardware, software, or combinations thereof.

Initially, the Vsync state machine 82 holds off and remains idle until receiving the incoming Vsync signal on connection 8S, as is indicated at state 117. After the Vsync state machine 82 receives an incoming Vsync signal on connection 8S, the Vsync state machine 82 progresses to a state 118. While in the state 118, the Vsync state machine 82 generates the display Vsync signal on connection 86 for 4 lines. After 4 lines, the Vsync state machine 82 progresses to the state 119. While in the state 119, the Vsync state machine 82 permits data lines to be transferred from the output shift register 54 to the display 25 (FIG. 2).

While in state 119, when the Vsync state machine 82 receives a vertical decision flag on connection 79, it will determine whether 8 frames have been read from the split memory S2, based upon the count in the frame counter 87. If 8 frames have not been read, then the Vsync state machine 82 will progress to the state 120. While in the state 120, the Vsync state machine 82 will send 8 lines of vertical front porch 19 (FIG. 1), as indicated at reference numeral 98 in FIG. 4. After these 8 lines have been output, the Vsync state machine 82 progresses to the state 118.

While the Vsync state machine 82 is at the state 119, if it receives the vertical decision flag on connection 79 and if 8 frames have already been read from the split memory 52, then the Vsync state machine 82 will proceed to the state 117, where it holds off and refrains from outputting the display Vsync signal on connection 86. The Vsync state machine 82 will wait in state 117 until it receives an analog video sync signal, indicating that the vertical front porch 19 is over. Because of the design of the system, the Vsync state machine 82 will wait 6, 8, or 10 horizontal lines 98 for the analog video sync signal.

Thus, the system 50 permits frame rate conversion of two asynchronous video formats using asynchronous pixel clocks while avoiding video tearing. Moreover, the frame rate conversion is accomplished between two continuous uninteruptable data streams. Finally, the disparity in the number of horizontal lines between two consecutive frames in the display signal is minimized.

Method for Performing Data Transfers From the Split Memory to the Output Shift Register Within the Vram Frame Buffer In general, one data transfer from the split memory 52 to the output shift register 54 must be performed during the shifting out of one pixel data line to the display 25 (FIG. 1) from the output shift register 54. This operation ensures that every pixel data line shifted out to the display 25 has the most recent frame buffer contents for that line's location. Due to the asynchronous nature of the frame buffer control 62 and the display control 67, a method is needed for determining when to perform data transfers from the split memory 52 to the output shift register 54 without interrupting the normal data flow to or from the frame buffer 34.

From Table A and B hereinbefore, it is apparent that a period of one horizontal line 11 in the incoming analog video signal 23 is 15,888 microseconds and that of the display 25 is approximately 19.3 microseconds. Accordingly, it can be seen that while shifting out one data line for the display 25, about 1.2 data lines are written to the split memory 52 by the analog video signal 23. In accordance with the novel method of the present invention, the following is performed. After the frame buffer control 62 determines that the incoming analog back porch 16 has been deasserted, the frame buffer control 62 asserts a write command on connection 64 to begin writing the incoming horizontal line 11 into the split memory 52. The writing operations continue until the incoming analog front porch 14 is asserted. At this point, the frame buffer control 62 causes the VRAM frame buffer 34 to perform a CAS before RAS (CBR) refresh cycle(s) via CBR control connection 63. Finally, after the CBR refresh cycle(s), the frame buffer control 62 causes the VRAM frame buffer 34 to transfer a line 56a, 56b to a register region 54a, 54b if that has not already been done during the current outgoing horizontal line to the display 25. The transfer is effectuated on connection 61.

The frame buffer control 62 determines whether or not a data transfer has occurred within the VRAM frame buffer 34 by monitoring the current and previous states of the qsf signal on connection 96, which is ultimately generated by the VRAM frame buffer 34. The qsf signal on connection 96 is sampled only when the frame buffer control 62 reaches the split data transfer decision point.

Figure 8:
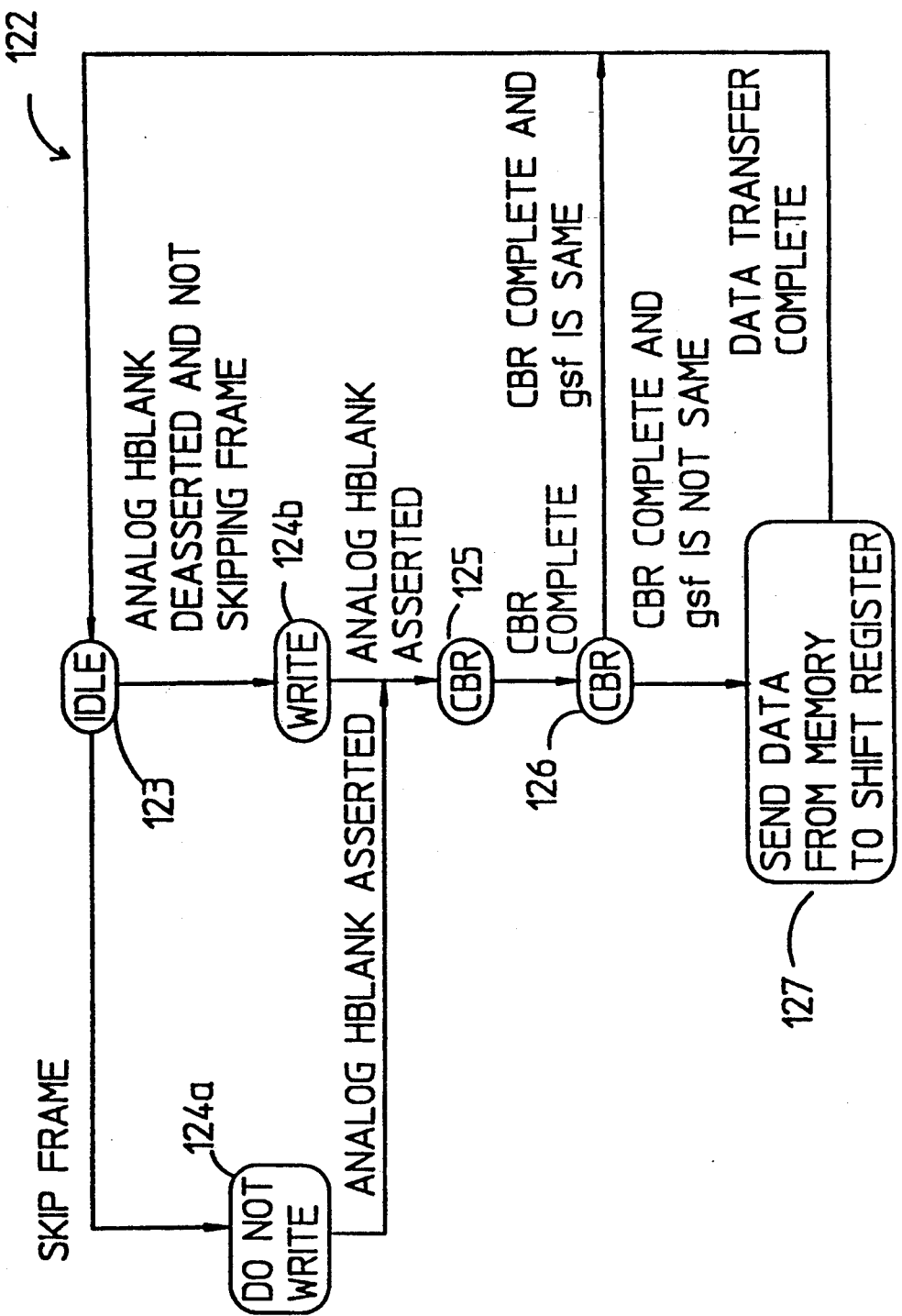
FIG. 8 is a state diagram illustrating the logic structure, functionality, and operation of a frame buffer control of FIG. 3.

The state diagram 122 of FIG. 8 illustrates the logic structure, functionality, and operation of the frame buffer control 62 of FIG. 3. The frame buffer state machine 62 is preferably implemented in conventional programmable array logic (PAL). However, obviously, other implementations are possible, including hardware, software, or combinations thereof. Referring to FIG. 8, the frame buffer control 62 initially assumes a state 123, where it remains idle while waiting for the Hblank to be deasserted. After the frame buffer control 62 determines that the incoming analog Hblank has been deasserted, it determines whether or not it is to skip the next frame based upon the snf signal on connection 89. If it is determined by the frame buffer control 62 that the next frame is to be skipped, then the frame buffer control 62 proceeds to the state 124a, where the frame buffer control 62 waits for the incoming Hblank period to again be asserted. Otherwise, if the frame buffer control 62 determines that the incoming Hblank period has been deasserted and that it is not supposed to skip the next frame, then the frame buffer control 62 proceeds to the state 124b.

While at the state 124b, the frame buffer control 62 asserts the write command on connection 64 to the VRAM frame buffer 34 causing writing operations into the split memory 52. The foregoing writing operations continue until the Hblank period is again asserted. When the Hblank period is asserted, the frame buffer control 62 progresses to the state 125, wherein the frame buffer control 62 causes the VRAM frame buffer 34 to perform a CBR refresh cycle via CBR control connection 63. After the foregoing CBR refresh cycle is complete, the frame buffer control 62 proceeds to state 126, wherein the frame buffer control 62 causes the VRAM frame buffer 34 to perform another CBR refresh cycle. After the CBR refresh cycle is complete, the frame buffer control 62 samples the qsf signal on connection 96.

If the qsf signal is in the same logic level as it was during the previous time at state 126, then the frame buffer control 62 proceeds to the state 123, where it remains idle and does not cause the data transfer from the split memory 52 to the output shift register 54. However, if the qsf signal is not the same as it was during the previous state 126, then the frame buffer control 62 causes the VRAM frame buffer 34 to transfer a line 56a, 56b to its respective shift register region, 54a, 54b via the transfer control connection 61, as is indicated at state 127 in FIG. 6.

After the frame buffer control 62 has commanded the VRAM frame buffer 34 to transfer data, the frame buffer control 62 proceeds to the state 123, where it remains idle until it determines that the incoming Hblank period has again been deasserted. The aforementioned process repeats.

Thus, the split data transfer method guarantees exactly one split data transfer Will occur during the shifting out of one horizontal line 11 to the display 25.

It will be obvious to one of skill in the art, that many variations and modifications may be made to the embodiments described hereinbefore without substantially departing from the spirit and scope of the present invention. It is intended that all such variations and modifications be included herein within the scope of the present invention, as is set forth in the following claims.

We claim:

1. A system for synchronizing data transfers to and from a video frame buffer which are asynchronous, concurrent, and each continuous, the system comprising:
   the frame buffer for storing a frame of pixel data, said frame buffer having a split memory for communicating the pixel data to a split output shift register;
   a frame buffer control means for controlling writing operations of incoming pixel data to the split memory at a first frame rate; and
   a display control means for controlling reading operations of the pixel data from the output shift register at a second frame rate which is slower than said first frame rate, said display control means for counting frames of the pixel data read from said split output shift register, said display control means for aligning in time initiation of said writing and reading operations after a particular number of said frames has been counted, said display control means for preventing said writing operations during a frame after said alignment so as to prevent said frame buffer control means from writing over and destroying existing pixel data which has not yet been read from said split memory.

2. The system of claim 1, wherein said frame buffer is a VRAM.

3. The system of claim 1, further comprising a digitally-controlled display.

4. The system of claim 1, wherein said display control means is clocked by a first clocking mechanism and said frame buffer control means is clocked by a second clocking mechanism, said first and second clocking mechanisms being asynchronous.

5. The system of claim 1, further comprising a synchronizing means for communicating control signals between said frame buffer control means and said display control means.

6. The system of claim 1, wherein said display control means comprises:
   a display oscillator generating a display clock signal;
   a horizontal synchronization state machine which receives said display clock signal and generates display horizontal synchronization signals for driving a display based upon said display clock signal;
   a vertical synchronization state machine which receives said display clock signal and incoming vertical synchronization signals, said vertical synchronization state machine for generating a display vertical synchronization signal for driving the display; and a counter connected to said vertical synchronization state machine, said counter configured to count frames of said pixel data read from said frame buffer so that said vertical synchronization state machine can determine said particular number of said frames.

7. A method for synchronizing concurrent asynchronous data transfers to and from a video frame buffer for storing a frame of pixel data, the frame buffer having a split memory and a split output shift register, the split memory for communicating the pixel data to the split output shift register, the method comprising the steps of:

performing writing operations of the pixel data to the split memory at a first frame rate;

performing reading operations of the pixel data from the split output shift register at a second frame rate which is slower than said first frame rate;

counting frames of the pixel data which are read from said output shift register;

synchronizing said writing and reading operations after said a particular number of frames has been counted; and preventing the writing of a frame into said split memory after said particular number of said frames has been counted so as to prevent writing over and loss of existing pixel data which has not yet been read from said split memory.

8. A method for initiating data transfers from a split memory of a video frame buffer to a split output shift register so that asynchronous continuous data transfers to and from the video frame buffer can be performed, the method comprising the steps of:

(1) monitoring for the occurrence of a blank period of an incoming video signal;

(2) transferring an output data line from a first register region of said split output shift register to a display;

(3) initiating, during step (2), transfer of an internal data line from a memory region of said split memory to a second register region of said split output shift register when said blank period occurs; and (4) refraining, during step (2), from initiating the transfer of said internal data line from said split memory to said second register region of said split output shift register when said blank period occurs and when a prior internal data line has already been transferred from said memory region during said transfer of said output data line.

* * * * *